US005499707A

United States Patent [19]

Steury

[11] Patent Number: 5,499,707

[45] Date of Patent: Mar. 19, 1996

[54] AUTOMATED MERCHANDISING KIOSK

[75] Inventor: Rudy Steury, College Park, Ga.

[73] Assignee: Compu-Shop, Inc., Eden Prairie, Minn.

[21] Appl. No.: 381,475

[22] Filed: Jan. 31, 1995

[51] Int. Cl.$^{6}$ .............................. B65G 1/137; G07F 11/42

[52] U.S. Cl. .............................. 194/217; 221/2; 221/264; 186/36; 235/381; 414/280

[58] Field of Search .............................. 194/215, 216, 194/217; 186/35, 36, 52, 53, 55, 56, 57; 414/280, 281, 283, 277; 901/16, 40; 221/2, 263, 264, DIG. 1; 235/381, 383

[56] References Cited

U.S. PATENT DOCUMENTS

| | | | |
|---|---|---|---|
| 3,840,131 | 10/1974 | Castaldi | 414/281 |
| 4,638,312 | 1/1987 | Quinn et al. | 186/53 X |
| 4,690,602 | 9/1987 | Castaldi et al. | 414/280 X |
| 4,756,657 | 7/1988 | Kinney | 414/280 X |
| 4,812,629 | 3/1989 | O'Neil et al. | 235/383 |
| 4,858,743 | 8/1989 | Paraskevakos et al. | 235/381 X |
| 4,903,815 | 2/1990 | Hirschfeld et al. | 414/280 X |
| 5,020,958 | 6/1991 | Tuttobene | 414/281 |
| 5,042,686 | 8/1991 | Stucki | 194/217 X |
| 5,139,384 | 8/1992 | Tuttobene | 414/281 |
| 5,303,844 | 4/1994 | Muehlberger | 235/381 X |
| 5,412,189 | 5/1995 | Cragun | 235/381 X |
| 5,431,250 | 7/1995 | Schlamp | 235/381 X |

FOREIGN PATENT DOCUMENTS

| | | | |
|---|---|---|---|
| 0024597 | 2/1977 | Japan | 194/215 |
| 0040484 | 3/1979 | Japan | 186/57 |

*Primary Examiner*—Michael S. Huppert
*Assistant Examiner*—Scott L. Lowe
*Attorney, Agent, or Firm*—D. L. Tschida

[57] ABSTRACT

A multi-product, self-service merchandising kiosk having a walk-in enclosure, interactive selection panel, illuminated merchandise display, internal drink dispenser and modular, dry goods dispenser having multi-compartmented inventory shelving and bottomless storage drawers. Purchases are selected via audio visual instructions entered at an interactive touch panel containing graphical icons, and a monitor having a menu and overlaid with an array of infrared transmitters and receivers. A programmable controller controls the drink and dry goods dispensers, manages payment transactions via a bill receiver, coin changer, credit card verifier, and receipt printer and provides periodic inventory status reports. A merchandise selector includes a motor driven, track supported collection bin and electromagnetic drawer puller. The selector aligns the bin to selected inventory drawers, extends and retracts the drawers and conveys the selected merchandise to a customer dispenser.

18 Claims, 9 Drawing Sheets

AUTOMATED MERCHANDISING KIOSK

BACKGROUND OF THE INVENTION

The present invention relates to automated dispensing equipment and, in particular, to a merchandising kiosk for sundry dry good products packaged to differing sizes and shapes.

Varieties of merchandise dispensing assemblies have been developed for many different types of products. Most typically such assemblies operate with uniformly packaged products. Depending upon the packaging, an attendant electro-mechanical support assembly contains the individual packages and sequentially advances the product as requested by a user. Refrigerated and heated products are maintained in enclosures having mechanical support units which dispense the product at a preferred temperature for the product.

Frequently encountered examples of this type of dispensing equipment are dispensers for snack foods such as canned and bottled beverages, candy, chips, popcorn, ice cream bars, etc. The products are arranged in one or more partitioned racks, trays or spiral clamps in seriatim fashion. The product is dispensed by incrementally advancing the support assembly in response to user entered selections and deposited moneys.

U.S. Pat. Nos 4,412,292; 4,766,548; 5,159,560; and 5,207,784 disclose remotely monitored vending dispensers for beverages and video cassettes. Associated control is included for monitoring, recording and/or communicating inventory status to a control center. Inventory administration can be performed on-site or communicated to the central center. Support personnel either on a periodic basis or in response to reported status data access and maintain the inventory.

Information, postage and newspaper kiosks are also known at U.S. Pat. Nos. 5,369,258; 5,271,669; 4,817,043; 4,571,898; and 4,265,059. The former kiosks include interactive capabilities and dispense information from a contained monitor and stamps from a dispenser. The latter newspaper kiosks principally provide enclosures for papers and various novelty items.

A variety of automated teller machines are also known having an interactive control capabilities, and dispensers for distributing money. Interactive greeting card dispensers are also known which custom print cards in response to user entries.

Although the foregoing dispensers have proven adequate for limited selections of uniformly packaged products, a need exists for merchandising equipment capable of dispensing non-uniformly packaged products; particularly large inventories of many types of products, for example 200 to 600 different selections. Preferably any such dispensing station should be unmanned and require little human intervention. The station should also automatically perform many necessary administrative functions.

The present invention was developed to provide an interactive, self-service, merchandising kiosk. The kiosk is adaptable to containing an inventory of 200 to 500 different product selections, such as found in a gift or novelty shop or newsstand. With the exception of periodic maintenance or inventory replenishment, the kiosk is unmanned. Administrative functions are performed by a local programmable controller and are reported to a remote monitoring station. Customer selections are made through an interactive audio-visual display panel and payment can be made with either cash or credit card.

SUMMARY OF THE INVENTION

It is therefore a primary object of the invention to provide an automated, self-service merchandise dispenser capable of dispensing a large variety of liquid beverages and different dry good products of differing size and package configuration.

It is a further object of the invention to provide a dispenser having a walk-in enclosure which permits access to shelved inventory and permits periodic maintenance and servicing.

It is a further object of the invention to provide an interactive dispenser providing audio instructions and audio-visual feedback relative to customer entered selections.

It is a further object of the invention to provide a dispenser capable of cash or credit card transactions and able to provide receipted transactions.

It is a further object of the invention to provide modular inventory shelving containing shelf mounted, multi-compartmented, bottomless slide drawers which contain inventory.

It is a further object of the invention to provide a controller which cooperates with a selector assembly that is responsive to programmable X, Y and Z axis coordinates of inventory storage locations and an electromagnetic extractor responsive to coordinates representative of current inventory location and status at each slide drawer.

It is a further object of the invention to provide feedback controlled vertical and horizontal chain drives at a selector or product collection assembly and a belt drive at the extractor assembly.

It is a further object of the invention to provide one or more interactive touch displays which cooperate with a graphics panel or a merchandise display case.

Various of the foregoing objects, advantages and distinctions of the invention are apparent from a preferred construction which provides a walk-in kiosk. Inventory is contained at a beverage dispenser and a modular arrangement of vertical and horizontal dry goods shelves that are accessible from an interior access space. Each shelf contains a number of bottomless, multi-compartmented drawers that slide on the shelves. A variety of merchandise of differing sizes and configurations are contained at the drawers. The physical dimensions and parameters of each drawer and the X, Y coordinates of each drawer location is programmed into a digital controller. Magnetic pull tabs or plates attached to the drawers cooperate with a closed loop motorized dispenser that is axially directed in response to X, Y, and Z drive signals. The tabs permit drawer withdrawal and limit the re-insertion depth.

Initial inventory location and status is also programmed into the digital controller which monitors customer purchases and payments at an associated bill receiver, change and receipt dispenser and credit card verifier. Appropriate Z axis drive signals are determined in relation to the computed current inventory status. A modem connection validates credit transactions and permits reporting periodic administrative reports to a central station and from which maintenance personnel are dispatched to maintain inventory supplies.

Still other objects advantages and distinctions of the invention will become more apparent upon reference to the following description with respect to the appended drawings. To the extent various modifications and improvements have been considered they are described as appropriate. The description should not be literally construed in limitation of the scope of the invention. Rather, the invention should be construed from the spirit and scope of the appended claims.

DESCRIPTION OF THE PREFERRED EMBODIMENT

Figure 1:
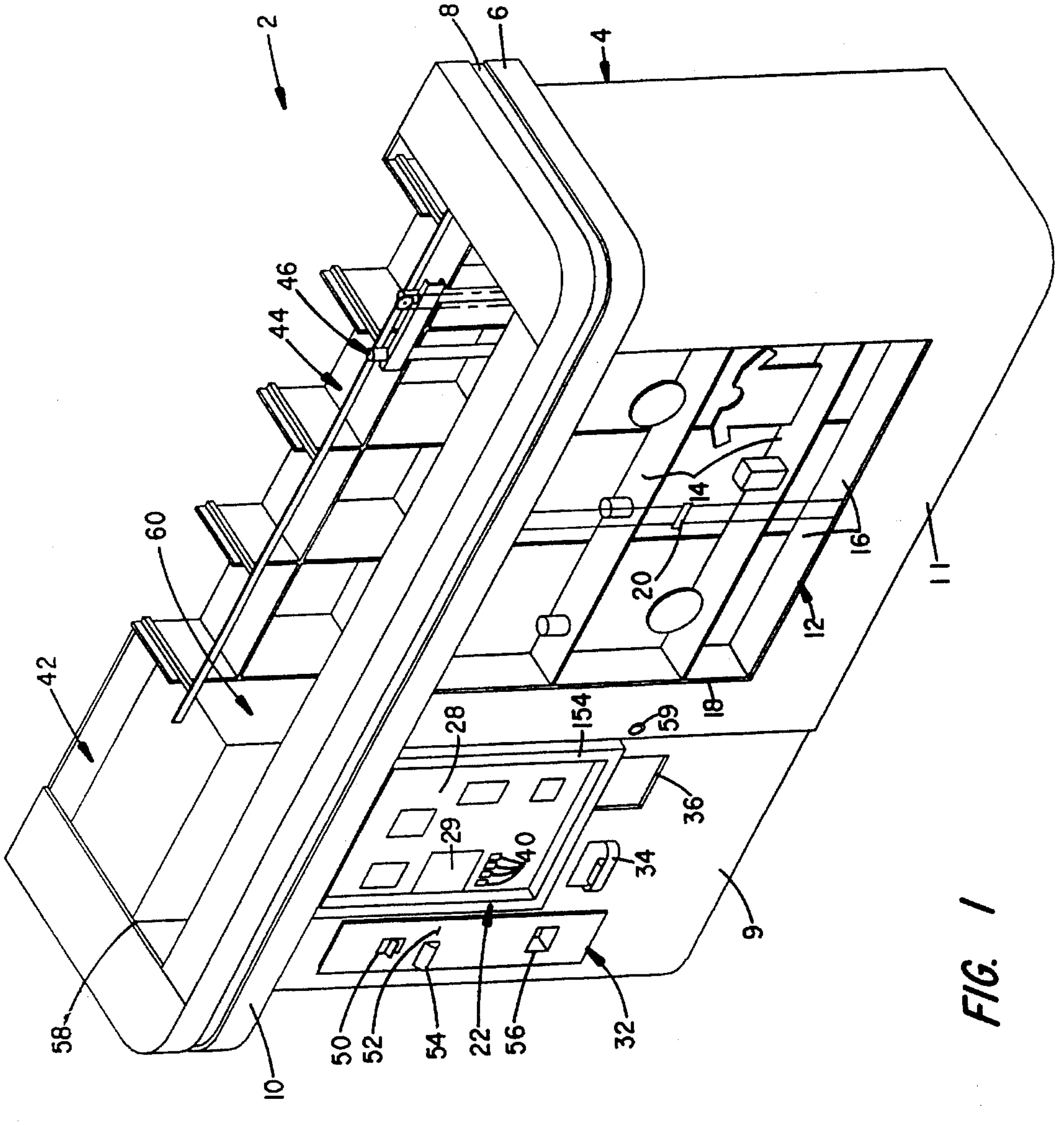
FIG. 1 shows a perspective view of the merchandising kiosk with the top panel removed.

With attention to FIG. 1, a perspective view is shown of the merchandising kiosk 2 of the invention. The kiosk 2 provides a merchandise vending center for a variety of novelty items, personal care items, beverages, candy, snacks and other items commonly sold in gift shops. With the exception of periodic maintenance and re-supply of inventory, the kiosk 2 is fully automated and does not require any sales staff.

The kiosk 2 can be readily fitted to available wall space or central floor space at many commercial establishments without undue cost. With the exception of necessary power and telephone connections, the kiosk 2 requires no special electrical or plumbing .connections. The kiosk 2 occupies a floor space of approximately 4 feet ×10 to 15 feet, depending upon the volume of merchandised inventoried. As more or less inventory is required, the physical size of the enclosure 4 can be adjusted. As configured at FIG. 1, an open back of the enclosure 4 is mounted against an available wall.

The kiosk 2 is normally positioned in proximity to areas of high pedestrian traffic at a commercial establishment. In a typical setting, the kiosk 2 might be set in an available corridor adjacent a lobby of a hotel, hospital or other commercial establishment. A relatively high visibility location is preferred, which is in the normal travel path of the targeted customer, and which is convenient to periodic monitoring by on-site staff to assure optimal customer satisfaction and provide a degree of security.

The enclosure 4 is constructed as a wood framed structure and provides a laminated wood and metal trim exterior. The enclosure 4 includes a canopy 6 which projects beyond the enclosure walls 4. The canopy 6 includes a metal trim strip 8 and supports associated accent lighting (not shown) in a space between an outer flange 10 and the front walls of the enclosure 4.

The enclosure 4 can be constructed to any number of shapes. It can also be constructed using a variety of conventional metal and wood framing techniques to provide any desired degree of relative security for the contained merchandise. A variety of accent arrangements can be provided, depending upon the esthetics of the mounting location and/or user preference.

The enclosure 4 includes a hinged panel 9 and a stationary panel 11. Prominently positioned at the front stationary panel 11 is a display case 12. The display case 12 is recessed approximately 6 to 12 inches and includes a number of conventional glass shelves 14. Various merchandise contained within the kiosk 2 is appropriately displayed on the shelves 14.

The display case 12 can be sized as desired and may alternatively project from either the stationary or hinged panels 11 and 9. Presently, the case 12 occupies a space approximately 6 feet wide by 5 feet tall by 6 to 12 inches deep. The size can be varied as desired in relation to the dimensions to the enclosure 2.

A pair of safety glass doors 16 cooperate with an extruded metal trim 18 which contains channels that support slide tracks for the doors 16. A lock 20 secures the doors 16.

The merchandise displayed in the case 12 is typically representative of some of the inventory contained within the kiosk 2. Detailed listings of the inventory are available at an adjacent interactive panel 22, discussed in more detail below, where a customer enters his/her selections. The enclosure 4 at the above dimensions is capable of supporting 300 to 500 different items in quantities sufficient to accommodate a 3 day inventory cycle for the fastest moving inventory. Larger or smaller enclosures can be constructed depending upon the merchandise and/or installation location.

Figure 8:
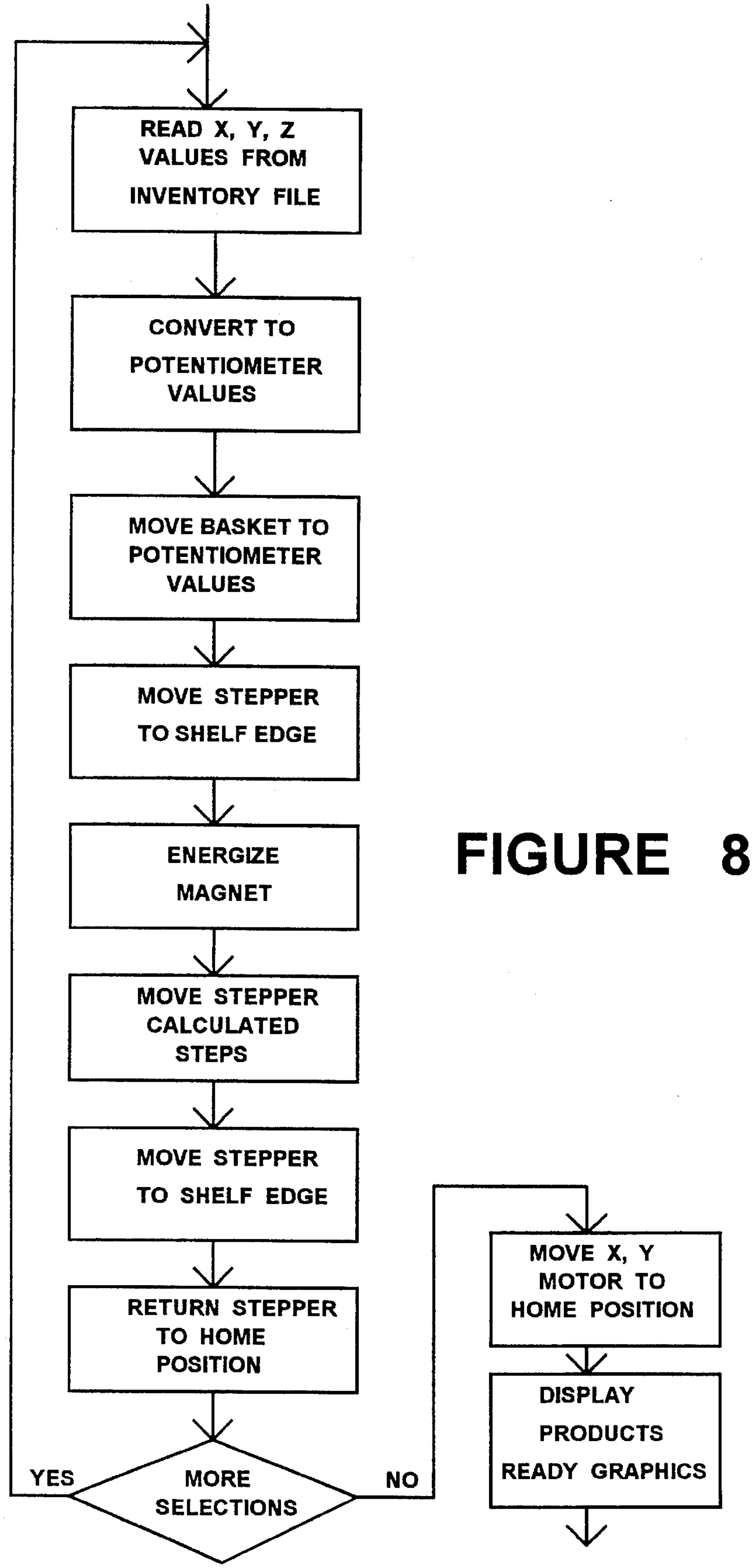
FIG. 8 is a flow chart to the drive control to the selector assembly performed by the controller.

For smaller enclosures 4 containing a relatively few items, the display case 12 may display the complete kiosk inventory. In such instance, the enclosure 4 can be fitted with appropriate control circuitry to use the display case 12 as a selector panel in a fashion comparable to the panel 22. Product selections can then be made by merely touching or pointing to the doors 16 in proximity to the displayed merchandise to cause the controller 30 to dispense the corresponding merchandise. More of the details of a display case 24 configured as a touch panel are discussed below with respect to FIG. 8.

Mounted to one side of the display case 12 is the interactive panel 22 and which senses customer movements to select specific products from inventory. A payment panel 32, beverage dispensing tray 34 and merchandise dispensing tray 36 border the panel 22.

Figure 6:
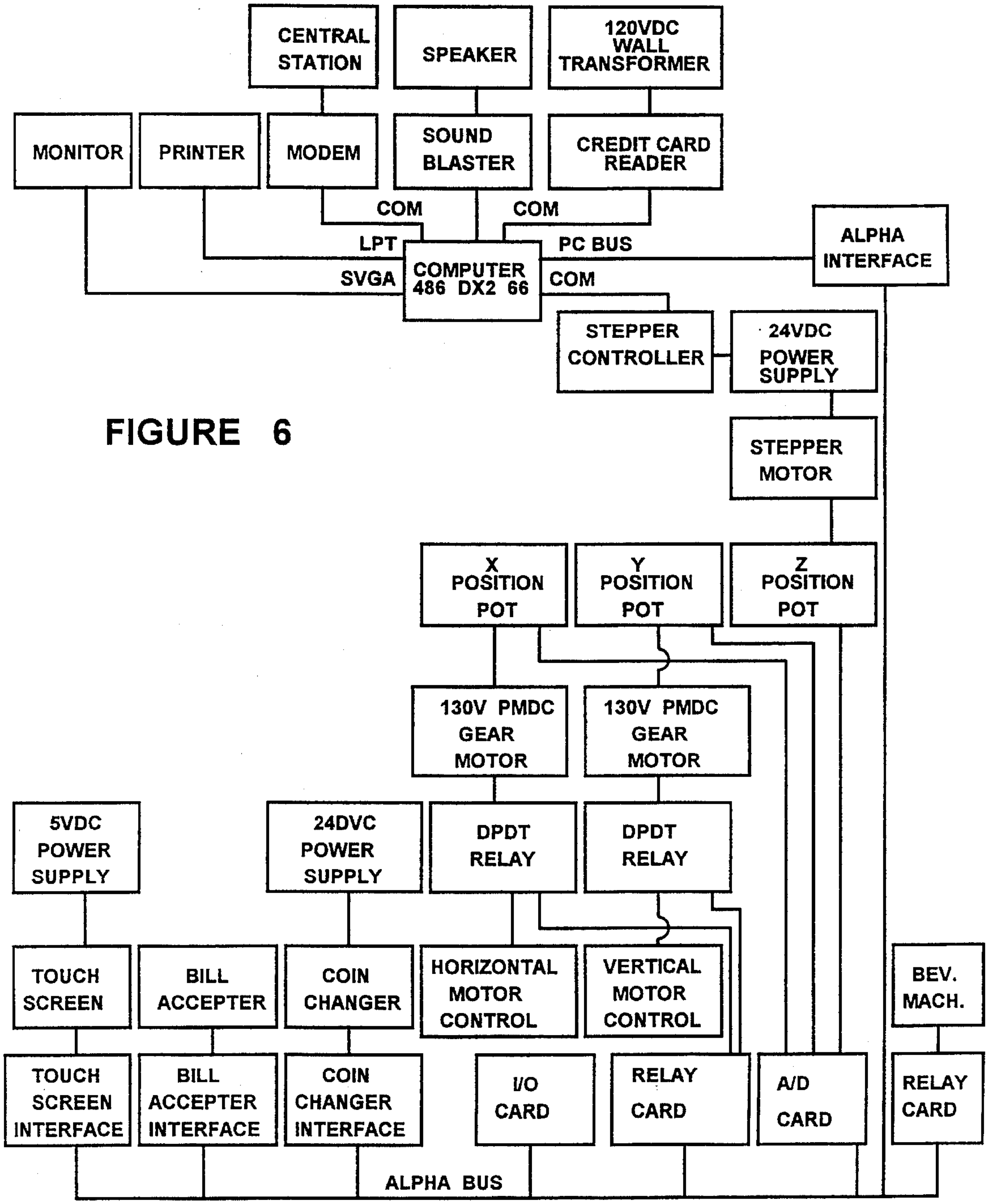
FIG. 6 is a schematic diagram to the digital controller.

The panel 22 includes a face plate 28 containing printed graphics and a cathode ray tube (CRT) monitors or other display screen 29. A computer controller 30, reference FIG. 6, is mounted behind the face plate 28. The face plate 28 is printed over with appropriate operating instructions and graphical icons 40 which depict general groupings or categories of inventory. The merchandise contained at each inventory grouping is further defined at the monitor 29. An audio speaker 38, reference FIG. 6, is also mounted to the enclosure 4 in close proximity to the panel 22 to broadcast audio instructions to assist the customer and messages to attract customers.

Figure 5:
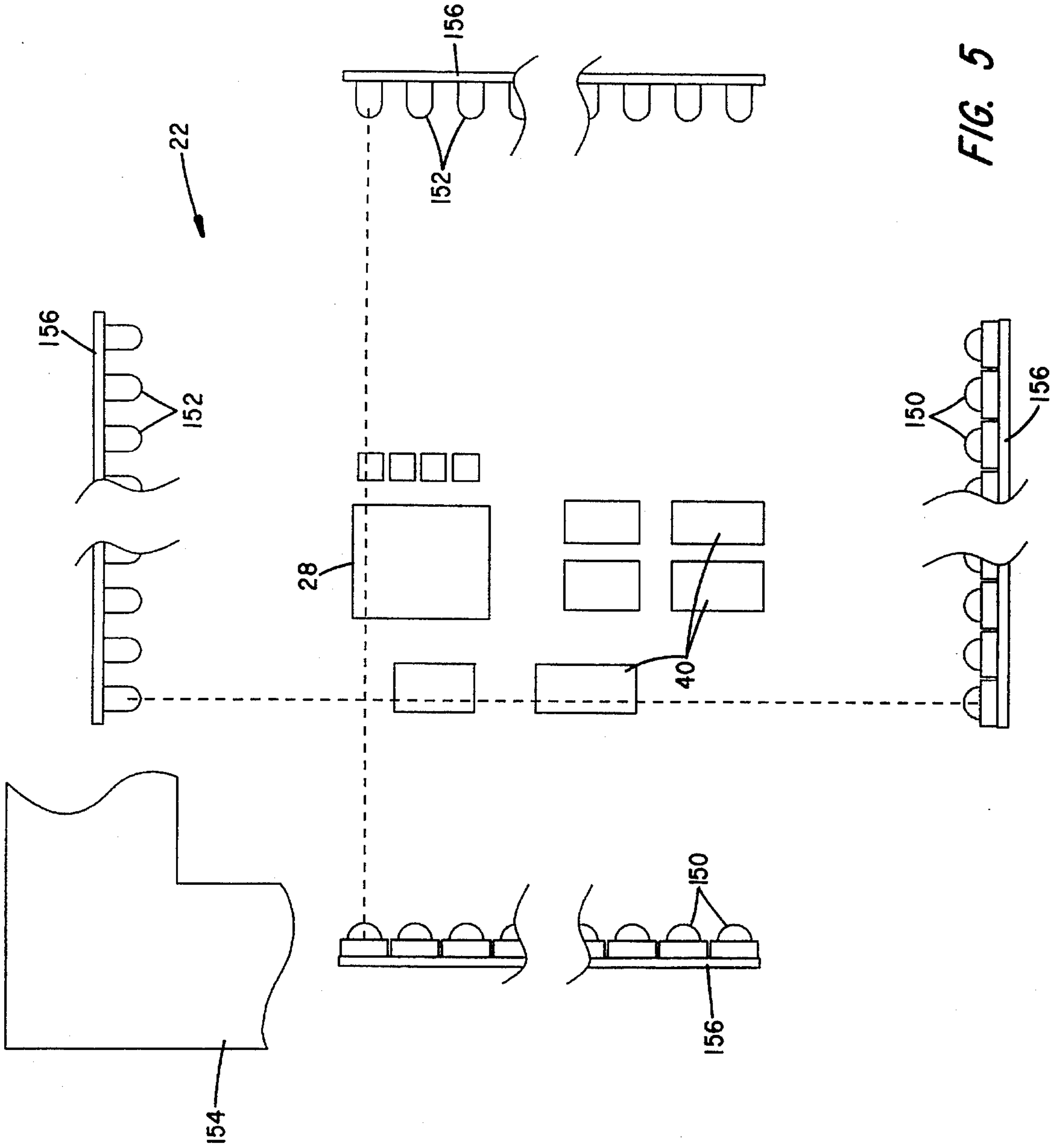
FIG. 5 shows a diagram of an infrared touch panel which is superposed over the graphic display and CRT monitor.
Figure 7:
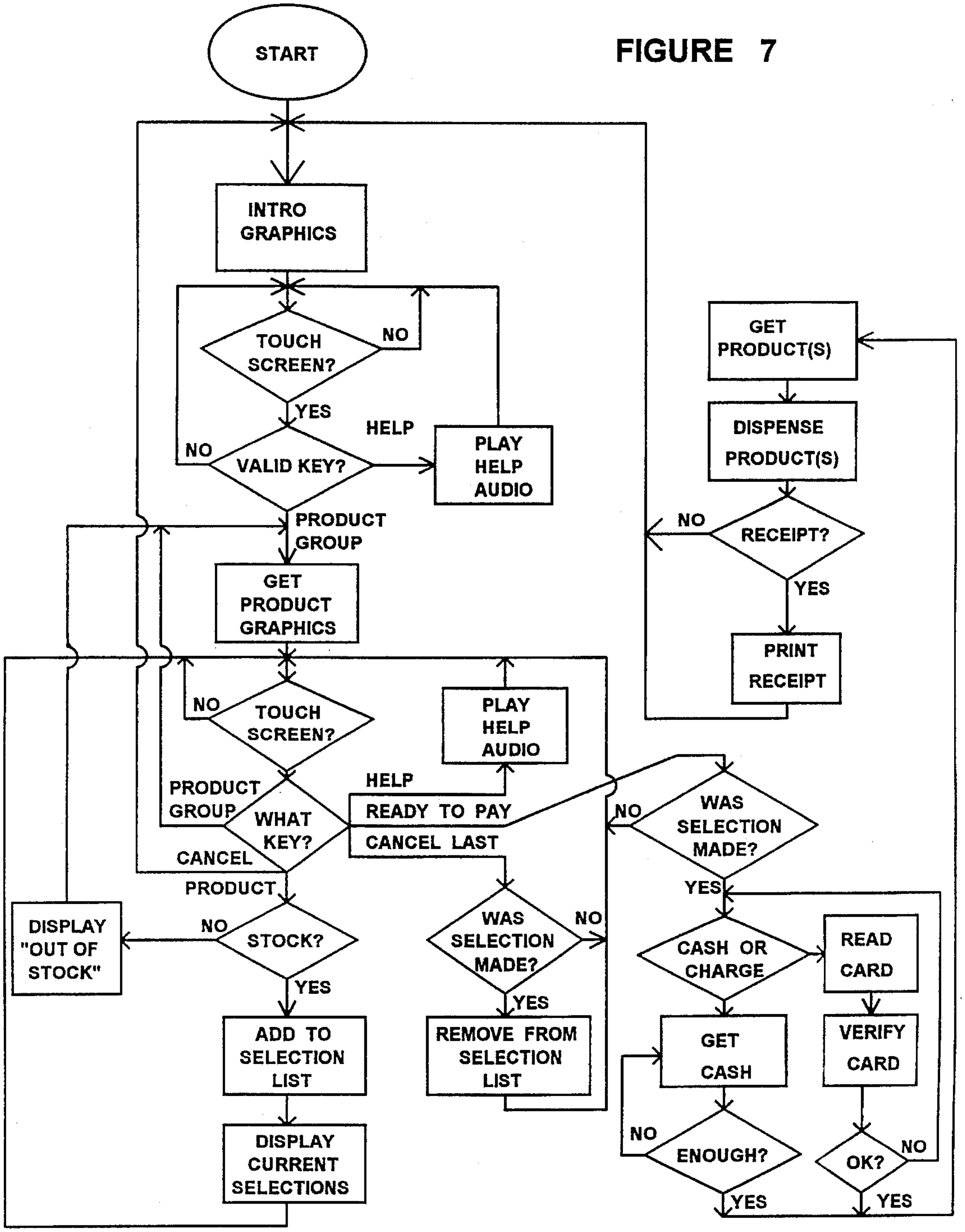
FIG. 7 is a flow chart to the interactive control sequencing performed by the controller.

The icons 40 and monitor 29 are aligned to a number of invisible, intersecting infrared beams, reference FIG. 5. With the customer's pointing to a desired icon 40 and interruption of the beams corresponding to the indicated product grouping, the monitor 29 is enabled to provide a detailed list of the related products. The customer next follows the menu'ed instructions and selection sequence displayed at the monitor 29 to make appropriate selections. A two step selection process is thus provided. FIG. 7 depicts a flow chart to the interactive selection process performed by the kiosk 2 with a customer.

The monitor 29 may alternatively provide specifically programmed, menu'ed instructions and/or listings to the customer for the particular merchandise programmed into the computer, without using icons 40 to pre-select category groups. The icons 40 might then be programmed to select the displayed product. Dedicated, specific purposes switches may also be mounted to the panel 22 and coupled to the computer controller 30 to appropriately operate the internally mounted dispensing equipment. The switches can be used in lieu of the touch screen capabilities at the panel 22 and monitor 29. A monitor 29 having an active touch screen may also be used alone or in association with the touch panel control of FIG. 5. A variety of types of intersecting electrical signals may also be substituted for the infrared beams.

With the selection, confirmation and payment for desired merchandise, supporting digital to analog interfaces and electro-mechanical drivers and servos, more fully discussed at FIG. 6, appropriately respond to user entered selections. The selected merchandise is dispensed at the trays 34 and 36.

Figure 2:
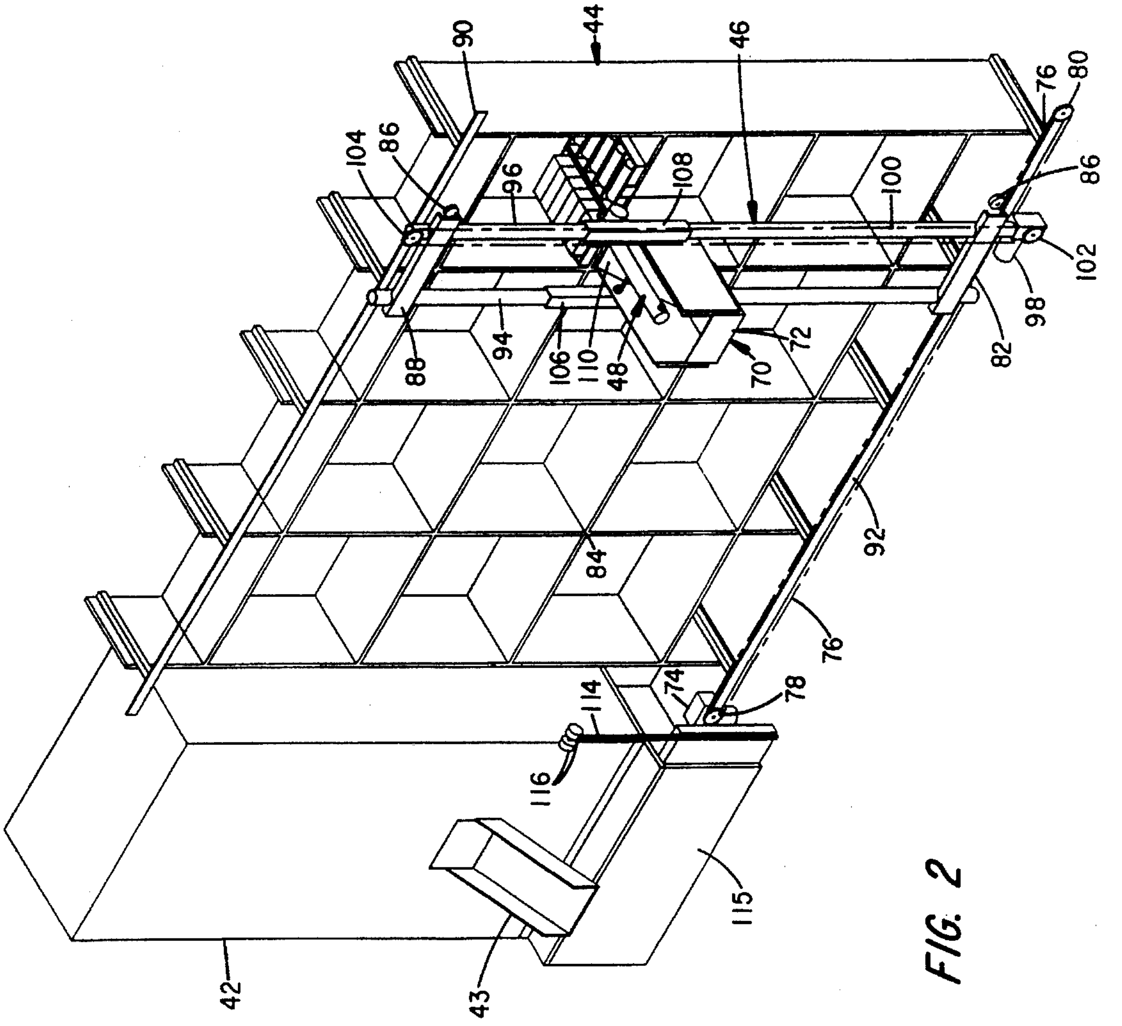
FIG. 2 shows a perspective view of the beverage dispenser, shelving and mechanized product selector and extractor assemblies.

The kiosk 2 is operative to dispense dry goods and beverages. With additional attention to FIG. 2, a conventional refrigerated beverage dispenser 42 is mounted inside the enclosure 4 and aligned to the tray 34 via a chute 43 to dispense selected cold beverages. A hot beverage dispenser might also be supported within the enclosure 4 and abutted to the hinged panel 9. The greater relative frequency of use of the drink dispenser 42 serves to acquaint and familiarize customers with the location the kiosk 2 and its operation. Once a customer is comfortable with the kiosk 2, larger purchases frequently are conducted to the merchandise displayed at the case 12.

Figure 3:
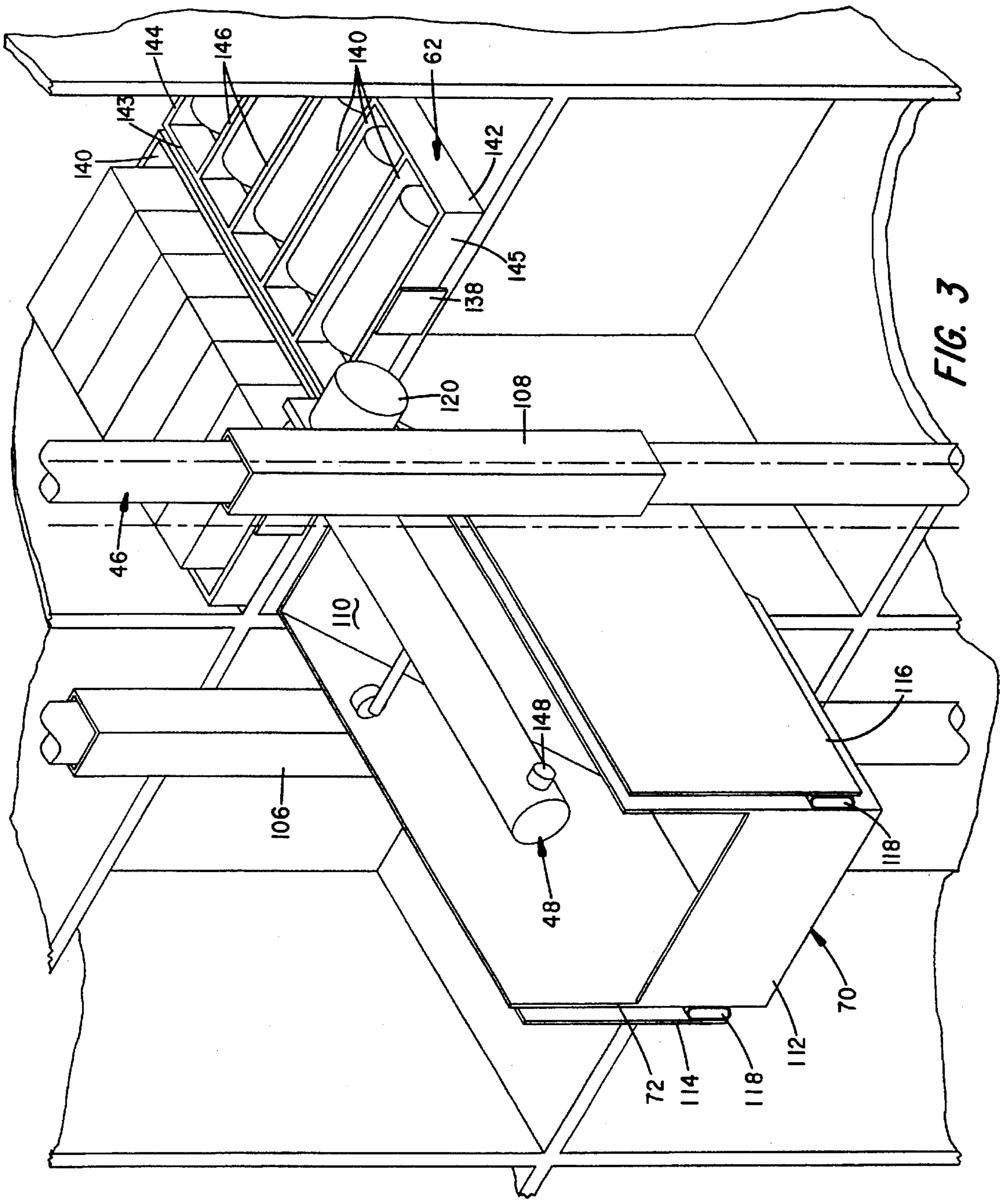
FIG. 3 shows a detailed perspective view of the extractor assembly in relation to a pair of inventory drawers.

The packaged dry good products exhibited at the display case 12 are dispensed at the tray 36. The merchandise is contained within the enclosure 4 at a modular shelving assembly 44. A merchandise selector or collection assembly 46 is mounted to the shelving 44. The controller 30 operates in response to confirmed customer selections to manipulate the selector assembly 46 and a contained extractor assembly 48 (reference FIGS. 2 and 3) to extract selected merchandise from the partitioned shelving 44 and convey the merchandise to the dispensing tray 36. The controller 30 maintains a running inventory of the merchandise contained at the kiosk 2 to appropriately direct the selector and extractor assemblies 46, 48. Sales reports, payment verification, maintenance and re-supply information are transmitted from the controller 30 over a modem 45 and available phone lines 47 to a central station 49, reference FIG. 6.

Coordinated with the controller 30 is the payment panel 32. The panel 32 includes a bill reader 50, credit card verifier 52, which is coupled to the modem 45, receipt printer 51, coin changer 54, and a coin and. receipt dispensing tray 56. The receipt printer 51, reference FIG. 6, is mounted to dispense a printed receipt at the tray 56 in addition to any coins directed from the bill reader 50 and coin changer 54.

The panel 9 and contained display and payment panels 22, 32 is hinged to the enclosure 4 at a vertical hinge 66. Upon disengaging a lock 68, the panel 9 can be rotated open to expose the beverage dispenser 42, monitor 29, computer controller 30, bill reader 50, credit card verifier 52, receipt printer 51, and coin changer 54. The various electro-mechanical support assemblies can thus be readily maintained and serviced.

Also exposed with the pivoting of the panel 9 is an access space or walkway 60 between the shelving 44 and back of the display case 12. The access space 60 extends the length of the shelving 44 and permits service and maintenance personnel access to the selector and extractors 46, 48 and the shelving 44 to maintain the inventory and proper operation of the kiosk 2.

Turning attention to FIGS. 2, 3, 4 and 8 particular details are shown to the construction and mounting of the shelving 44, selector assembly 46, extractor assembly 48 and a merchandise collector 70. The selector assembly 46 generally provides a track supported conveyer mechanism to the extractor and collector assemblies 48, 70. The collector 70 provides a collection bin 72 which receives and dispenses the dry goods selections.

Appropriate horizontal and vertical or "X" and "Y", Cartesian drive signals are provided from the controller 30 to a horizontal drive motor 74. A chain 76 is trained about a drive sprocket 78 and idler sprocket 80 and to a base frame 82 at the selector 46. Movement of the selector 46 is indexed to a pre-established index mark 84 that corresponds to a known reference at the shelving 44. Movements of the selector 46 are determined and directed by the controller 30 in relation to the index mark 84. Guide wheels 86 are supported to the base frame 82 and a top frame 88 of the selector 46. The wheels 86 mount within and follow a grooved track at upper and lower horizontal tracks 90, 92. The frames 82 and 88 are shown pulled away from the tracks to expose the guide wheels 86.

The extractor 48 is independently directable along a pair of tubular metal, vertical columns 94, 96 which extend between the base and top frames 82, 88. A vertical drive motor 98 mounted to the base frame 82 drives a-second chain 100 that is trained about drive and idler sprockets 102, 104 aligned to the column 96. A portion of the chain 100 extends within the column 96 and is secured to the extractor assembly 48 and collector assembly 70. Vertical drive signals to the motor 98 raise and lower the extractor 48. Gear motors 74 and 98 are presently used to control the X and Y movements of the selector 46. Such motors provide satisfactory positional control to a tolerance on the order of ¼ inch in the X, Y plane and 1/64 inch on the Z plane.

A pair of slide collars 106, 108 contain and guide vertical movement of the extractor 48 and collector 70. The collars 106, 108 mount over the vertical columns 94, 96 and include internal bearing surfaces which freely slide along the columns 94, 96 without hampering movement of either the extractor or collector assemblies 48, 70. The extractor 48 is secured to the collar 108 and the collector 70 is secured to each of the collars 106, 108. The collar 108, in turn, is secured to the ends of the chain 100 such that the extractor and collector assemblies 48, 70 are vertically directed by the drive motor 98.

The vertical "Y" drive signals are applied from the controller 30 to the motor 98, independent of the horizontal "x" drive signals to the motor 74, to raise and lower the extractor 48 to an appropriate shelf space and bottomless drawer or frame 62 containing an inventory item selected by the customer. The controller 30 is programmed with the location and amount of inventory loaded into the kiosk 2 with each re-fill and the corresponding X and Y drive signals are determined in relation to the initial inventory as the inventory is depleted. The horizontal and vertical drive signals are simultaneously supplied to the respective selector and extractor assemblies 46, 48 to reduce dispensing time. Alternatively, the X and Y drive signals may be sequentially applied. Analog feedback signals are coupled from the selector and collector 46, 70 to the controller 30 via potentiometers which are described in more detail below. The drive and feedback signals are presently correlated as voltage dependant signals that are related to the index.

Although not presently provided, secondary position confirmation can be obtained from transducers mounted about the shelving 44 to detect the relative movements of the selector, extractor and collector 46, 48 and 70. For example, limit switches may be secured to detect relative movement of the selector and collector 46, 70 to the shelving 44. Alternatively, photo-optic sensors or a variety of other known motion sensors can be positioned to detect and confirm proper movement of the dispensing assemblies 46, 48 and 70 in relation to the inventory. The inherent accuracy of the stepper motors and closed loop feedback obtained with included potentiometers have been found to provide adequate drive tolerances.

The collection bin 72 includes a wall 110 which is shaped to align to the shelving 44 and direct selected merchandise to the bin bottom. The length of the bin 72 is sized to permit full extraction of each merchandise drawer 62 at the shelving 44. As a drawer 62 is extended and an inventory containing compartment is exposed to the bin 72, the merchandise falls from the drawer 62 into the bin 72. The wall 110 provides a sloped surface which guides the selected merchandise to the bottom. A partial front wall 112 assures the merchandise does not prematurely fall from the bin 72 during transfer to the dispensing tray 36.

The collector 70 also includes a pair of side supports 114, 116 which are secured to the bin 72 at a pair of extensible slide tracks 118. The slide tracks 118 permit a horizontal extension of the bin 72 into abutment with the wall 9 at the merchandise tray 36.

Once the bin 72 is filled with an appropriate amount of selections, necessary X, Y drive signals are applied from the controller 30 to assure proper re-alignment of the bin to the tray 36. The drive signals are computed by the controller 30 in relation to current locational data and inventory data stored in temporary buffers, registers or memories at the controller 30.

Appreciating a customer can select multiple inventory items with each purchase, the controller 30 selectively manipulates the collector and extractor assemblies 48 and 70 to multiple locations before returning the bin 72 to the dispensing tray 36. For example, cigarettes, toothpaste and a tee-shirt might be individually selected from appropriate shelf locations, before the bin 72 is returned to the space behind the panel 9. Individual product transactions might also be made one at a time, but with corresponding increased amounts of time to complete an entire purchase transaction for multiple items.

With the return of the bin 72 to an X, Y location immediately behind the tray 36, the bin 72 is lowered onto a roller arm 113 that vertically projects from a base support 115 at the dispenser 42. Upon engaging the arm 113, a pair of rollers 117 follow the sloped wall 110 to laterally displace the bin 72 toward the tray 36. Bin movement is facilitated by a pair of slide tracks 118. A return spring (not shown) mounted between the bin 72 and side supports 114, 116 biases bin movement to assure the return of the bin 72 to a fully retracted position prior to the next selection sequence.

The lateral displacement of the bin 72 is required with the present kiosk 2 to accommodate the recessed display case 12. For enclosures which do not provide a recessed display case 12, lateral bin movement may not be required.

Also mounted to the slide collar 108 is the drawer extractor assembly 48. The assembly 48 includes a "Z" axis drive motor 120 and a toothed belt 122 which is trained about drive and idler sprockets 124, 126 that are aligned to a horizontally displaced tubular guide 128.

Figure 4:
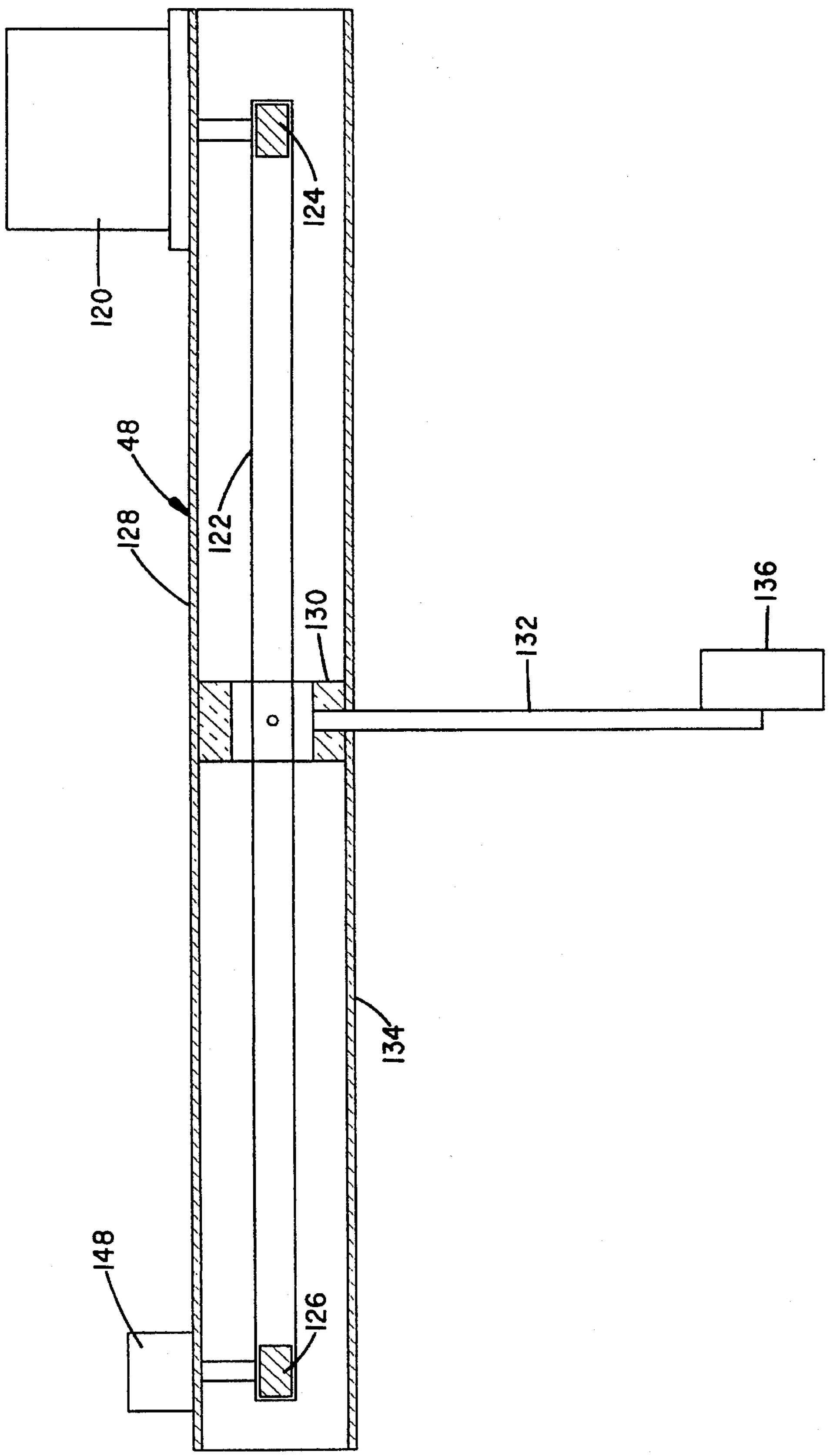
FIG. 4 shows a top plan view in cutaway of the drawer extractor assembly.

Ends of the belt 122 are fitted to a slide ring 130, which is concentrically mounted within the guide tube 128, and which is shown is greater detail at FIG. 4. An arm 132 transversely extends from the ring 130 through a slot 134 that extends along one side of the guide tube 128. An electromagnet 136 is secured to the end of the arm 132.

The magnet 136 cooperates with steel plates 138 secured to the front of each drawer 62. With the engagement of the magnet 136 to a metal plate 138, the drawer 62 can be extended and retracted an appropriate distance. The necessary "Z" axis drive signals to the motor 120 are determined in relation to specific pre-programmed data to the drawer dimensions and configuration and current inventory status.

The steel plates 138 are secured to the front wall of each drawer 62 to partially depend below the drawer bottom and engage an edge of the shelving 44. Each plate 138 therefore also serves as a stop limit to drawer movement as each drawer 62 is re-inserted onto the shelving 44.

The motor 120 is also operated to take advantage of an inherent tolerance to slippage. That is, the controller 30 slightly over extends the arm 132 as each drawer 62 is engaged and returned to assure good contact between the magnet 136 and plate 138 and between the plate 138 and shelving 44. Alternatively, an adjustable, resilient linkage might be fitted to the arm 132 to permit minor adjustments to accommodate movement tolerances of the extractor 48 and assure a close alignment between the magnet 136 and plate 138 prior to operation of the magnet 136 at the start of each drawer extraction.

A separate drawer withdrawal limit is not presently required, due to the inherent accuracy of the selector and extractor assemblies 46, 48. Each drawer 62 is presently withdrawn to within ¼ to ⅜ inch of the shelf edge. Depending upon travel tolerances, appropriate controls can be included to prevent over withdrawal of a drawer 62.

Returning attention to FIG. 3, the inventory storage frames or drawers 62 are configured to provide one or more compartments 140 for storing individual merchandise items. Rectangularly configured side and end walls 142–145 define the periphery of each drawer 62. One or more divider walls 146 may extend between the sidewalls 142, 143 to define the individual storage compartments 140. Presently, the divider walls 146 are constructed at even incremental spacings in increments of 1⅝ inches. The drawers 62 are also sized to provide 3, 4, 5 or 8 compartments at a preferred 13 inch depth. The drawers 62 provide a 12 inch width, although drawers of differing widths and lengths can be constructed to accommodate differing types of products. Each shelf is also sized to an approximate 24 inch width.

Each drawer 62 is constructed to be completely open at its bottom and top. Contained merchandise, which is shown for convenience in cylindrical and rectangular form, is thereby able to freely fall from each compartment 140 as each drawer 62 is withdrawn past the forward edge of the shelving 44. The open top assures the product will fall from the drawer 62 due to the product weight. For relatively flexible products, such as a shirt, it may be desirable to increase the sidewall height to prevent possible sticking of the product at the drawer 62.

Drawers of differing dimensions and compartment constructions may also be used at the shelving 44 without effecting dispensing operations. For example, the drawers 62 may be constructed to allow the user to fit each drawer with a variable number of compartments 140 and spacing between each divider wall 146.

Regardless of the drawer configuration, during initial programming it is necessary to define to the controller 30 the numbers of compartments 140 at each drawer 62 and the initial inventory. For the present kiosk 2, once the numbers of filled compartments 140 are identified, the controller 30 knows from pre-programmed drawer dimensions, the necessary Z drive signals to be applied to extract each drawer 62 a sufficient distance to dispense the contained inventory.

Proper axial movement is further confirmed to the controller 30 via a potentiometer 148 mounted to the idler sprocket 126. Similar potentiometers 147, 149 are provided at each drive chain 76 and 100, reference FIG. 6. Voltages indicative of traversed distances permit the controller 30 to make adjustments relative to the pulsed drive signals applied to the stepper motors 74, 98 and 120.

Turning attention next to FIG. 5, a generalized schematic diagram is shown to the construction of the interactive touch panel at the display panel 22. The touch panel is particularly constructed from a number of infrared transmitters 150 and receivers 152 that mount beneath a border trim 154 that extends around the periphery of the display panel 28. The transmitters and receivers 150, 152 are mounted to printed circuit strips 156. The transmitters and receivers 150, 152 are aligned to each other along opposite strips to define a matrix of intersecting light beams that coincide with the printed graphical icons 40 and the computer generated graphics at the monitor 29. With the disrupting of the intersecting beams, during a merchandise selection operation, the controller 30 sequentially determines the customer's selections, which are separately confirmed at the monitor 29.

FIG. 6 shows a schematic block diagram to the controller 30. The controller 30 is generally configured as a PC type computer around a contained processor, for example, a 486DX66 processor. The controller 30 is configured to include appropriate digital interface circuitry to the CRT 29, audio speaker 38, receipt printer 51, credit card reader 52 and modem 45.

Communications to related drive control circuitry are enabled via an alpha interface card 161 that communicates with analog drive interfaces. Digital to analog interface circuits 162, 164, 166 and 168 are coupled to the touch screen, bill acceptor 50, coin changer 54, and beverage dispenser 42. Separate I/O and relay circuits 170 and 172 couple drive signals to the drive motors 147 and 149. A stepper motor control interface card 174 couples drive signals to the Z drive motor 120. Digital feedback is obtained from the potentiometers 147–149 at the drive motors 74, 98, 120 and an analog to digital conversion circuit 176.

The various interfaces, drive controllers and other circuitry are of conventional construction, although are configured in a particularly advantageous arrangement in the present merchandising kiosks.

In normal operation and with attention also to the flow chart of FIG. 7, which depicts the operation of the controller 30 when interacting with a customer, the customer initially selects a product category or grouping from one of the icons 40 at the display panel 28. The icons 40 generally define novelty items, beverages, drug store items or any number or variety of other inventory categories.

Once the category is selected, the controller 30 responds to display the programmed items contained for that category at the CRT 30. The items can be displayed either in a textual or graphic format. Appropriate instructions or queries may also be displayed during the selection process. All user selections are made by merely interrupting the intersecting light beams.

Once the selection process is complete, the controller 30 displays a list of selected items and a related cost at the monitor 29. The customer can refine the list, as desired through a further selection or deletion process.

With the completion of the product selection, the customer enters a payment mode which can either be cash or credit card. Appropriate cash can be inserted at the bill and coin changers 50, 54 with change being dispensed at the coin and receipt dispenser 56. If payment is to be by credit card, the card is inserted into the card reader 52 and verified in conventional fashion through the modem 45 and communication link to the card supplier. With confirmation of necessary credit, the controller debits the account for the transaction amount and dispenses a printed receipt. Receipts may also be obtained for cash transactions, upon the customer indicating a request for same.

With the selection and payment processes completed, the customer engages the controller 30 to produce necessary X, Y, Z, drive signals through the touching of an activate icon. The controller 30 then manipulates the selector, extractor and collector assemblies 46, 48 and 70 to make suitable, sequential selections before returning and dispensing the items at the tray 36.

Although most customer transactions can be completed with a single picking sequence, limits can be programmed into the controller 30 to prevent overfilling the bin 72. For example, where a number of relatively large merchandise items are selected, preferably a relatively few of the larger items are permitted to be selected with each operation. Potential jamming or overfilling of the bin 72 is thus avoided.

Figure 9:
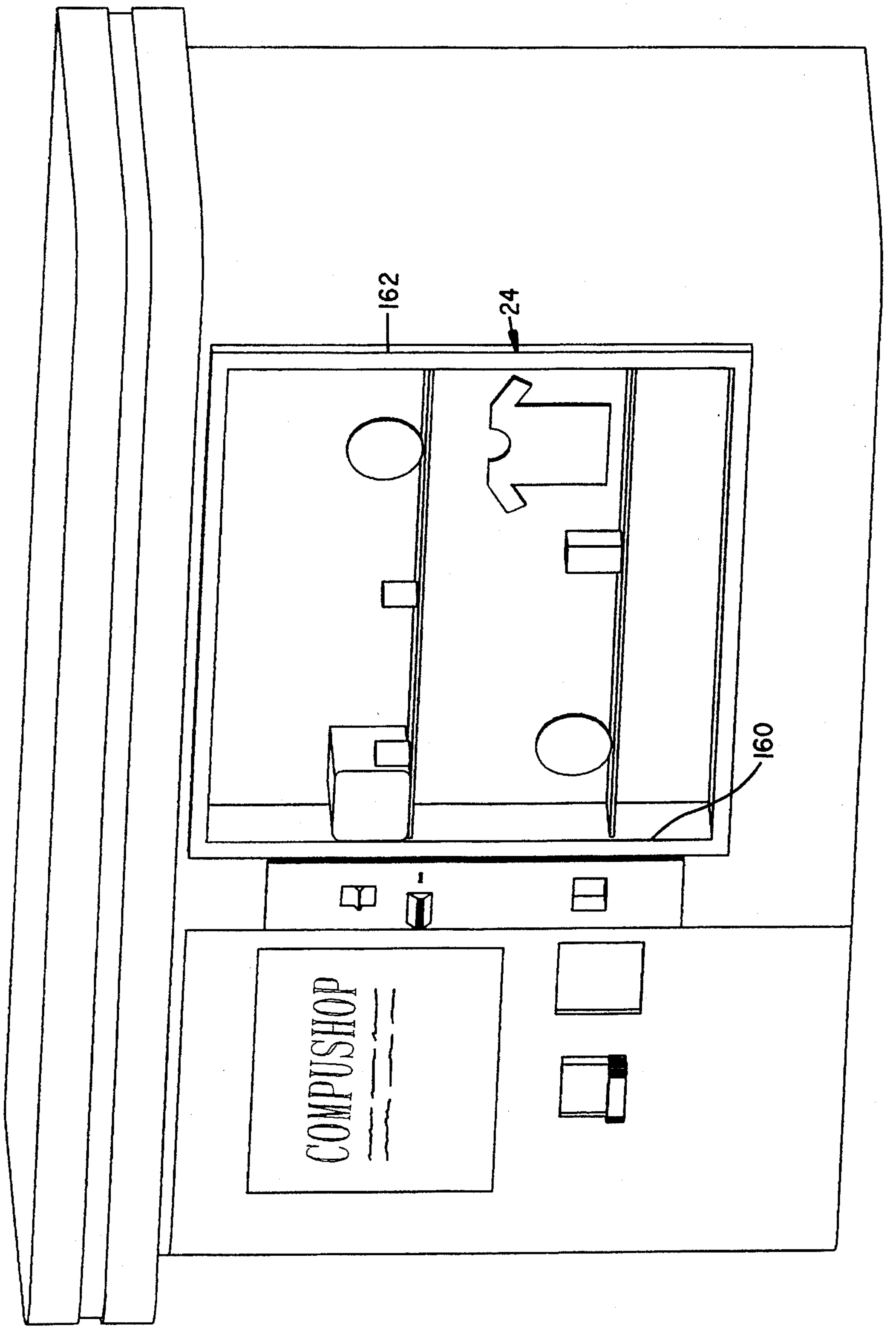
FIG. 9 shows a perspective view of a merchandising kiosk having a touch activated display case.

FIG. 9 depicts yet another kiosk configuration 160 wherein touch panel capabilities are provided at a display case 24. Operation of a touch panel 160 mounted beneath a trim 162 is essentially the same as described above for the panel 28 and wherein the customer interrupts intersecting infrared beams. The intersecting beams at the panel 160 are aligned to the displayed product. Merchandise selection occurs by merely pointing to the specific product displayed at the display case 24 versus performing separate category and item selections at graphical icons and a monitor.

While the invention has been described with respect to a presently preferred construction and various considered modification and improvements thereto, still other constructions may also be suggested to those skilled in the art. The invention should therefore not be narrowly construed to the foregoing description. Rather, the invention should be interpreted within the spirit and scope of the appended claims.

What is claimed is:

1. A self-service merchandising kiosk comprising:

(a) a portable multi-walled enclosure surrounding a plurality of shelves, wherein said shelves support a plurality of bottomless drawers, and wherein each drawer includes at least one compartment which circumscribes a merchandise storage space;

(b) display means for interactively selecting merchandise at a display panel responsive to non-contacting movement;

(c) means for receiving payment to selected merchandise; and (d) controller means responsive to said display means for conveying collection means to said drawers, said collection means being adapted for axially withdrawing selected drawers from said shelves to direct contained merchandise into a collection bin and for dispensing the collected merchandise to a tray communicating to the exterior of said enclosure.

2. Apparatus as is set forth in claim 1 wherein said enclosure includes means for dispensing liquid beverages.

3. Apparatus as set forth in claim 1 wherein said means for receiving payment accepts cash and credit card payments and dispenses change and printed receipts to a customer.

4. Apparatus as is set forth in claim 1 wherein said display panel comprises a panel containing a plurality of opaque icons, a monitor means for displaying menu'ed text and graphics, and means for producing a plurality of intersecting and interruptible infrared beams to overly the icons and monitor for identifying said merchandise to said controller means.

5. Apparatus as is set forth in claim 1 wherein said display panel comprises a locking merchandise display case having a transparent surface and containing a plurality of said merchandise items and including means for producing a plurality of intersecting and interruptible infrared beams overlying the contained merchandise items for identifying said merchandise to said controller means.

6. Apparatus as set forth in claim 1 wherein said collection means includes conveying means responsive to customer selections for conveying said bin into alignment with each of said drawers and extractor means for withdrawing a drawer a distance dependent upon a determined inventory available at said drawer to dispense the merchandise.

7. Apparatus as set forth in claim 6 including means for coupling feedback signals corresponding to movement of said collection bin to said controller means.

8. Apparatus as set forth in claim 6 including means for engaging a surface of said collection bin and manipulating said bin to abut said tray.

9. Apparatus as set forth in claim 6 wherein each drawer includes a plate secured to engage said shelves.

10. Apparatus as set forth in claim 9 wherein said extractor means includes a magnet for engaging said plate to extend and retract each of said drawers and wherein said magnet is mounted to a driven arm secured to a driven belt.

11. Apparatus as set forth in claim 6 wherein first and second driven chains convey said bin along a plurality of horizontal and vertical drive tracks, wherein an extractor means mounted to said bin is independently operable to extend and retract each of said drawers to dispense merchandise into said bin.

12. Apparatus as set forth in claim 11 wherein said extractor means includes a magnet for engaging a plate on each of said drawers to extend and retract each of said drawers and wherein said magnet is mounted to a driven arm secured to a driven belt.

13. A self-service merchandising kiosk comprising:

(a) a portable multi-walled enclosure surrounding a plurality of shelves, wherein said shelves support a plurality of bottomless drawers, and wherein each drawer includes at least one compartment which circumscribes a merchandise storage space;

(b) display means for interactively selecting merchandise via interruption of a plurality of intersecting beams overlayed to a display panel containing indicia of inventoried merchandise;

(c) means for receiving payment to selected merchandise and dispensing receipts; and (d) controller means responsive to said display means for conveying a collection bin into alignment with each of said drawers, wherein first and second driven chains convey said collection bin along a plurality of horizontal and vertical drive tracks, and wherein an extractor means mounted to said bin is independently operable to extend and retract each of said drawers to dispense merchandise retained in the storage space into said collection bin.

14. Apparatus as set forth in claim 13 wherein said display means includes monitor means coupled to a processor for displaying a plurality of merchandise items correlated to said icons aligned to said intersecting beams.

15. Apparatus as set forth in claim 13 wherein said display means comprises a panel including a plurality of icons identifying inventoried merchandise and monitor means coupled to a processor for displaying textual and graphical data.

16. Apparatus as set forth in claim 15 wherein said means for receiving payment accepts cash and credit card payments.

17. Apparatus as set forth in claim 15 including means for manipulating said collection bin in relation to a dispensing tray communicating through said enclosure.

18. A self-service merchandising kiosk comprising:

(a) a portable multi-walled enclosure surrounding a plurality of shelves, wherein said shelves support a plurality of bottomless drawers, and wherein each drawer includes at least one compartment which circumscribes a merchandise storage space;

(b) means for selecting merchandise contained within said enclosure;

(c) means for receiving payment to selected merchandise; and (d) controller means responsive to entered selections for conveying collection means to said drawers, said collection means being adapted for withdrawing selected drawers a determined axial distance from said shelves to direct contained merchandise into a collection bin and for dispensing the collected merchandise to a tray communicating to the exterior of said enclosure.

* * * * *